Feb. 22, 1955 W. W. PHARIS 2,702,832

TELEPHONE SYSTEM

Filed Aug. 14, 1952 4 Sheets-Sheet 1

*INVENTOR.*
WILLIAM W. PHARIS

BY Francis E. Blake

TELEPHONE SYSTEM

Filed Aug. 14, 1952 4 Sheets-Sheet 2

INVENTOR.
WILLIAM W. PHARIS

BY Francis E. Blake

TELEPHONE SYSTEM

Filed Aug. 14, 1952

4 Sheets-Sheet 3

INVENTOR.
WILLIAM W. PHARIS
BY Francis E. Blake

Feb. 22, 1955 W. W. PHARIS 2,702,832

TELEPHONE SYSTEM

Filed Aug. 14, 1952 4 Sheets-Sheet 4

INVENTOR.
WILLIAM W. PHARIS
BY Francis E. Blake

United States Patent Office 2,702,832

Patented Feb. 22, 1955

2,702,832

TELEPHONE SYSTEM

William W. Pharis, Rochester, N. Y., assignor to Stromberg-Carlson Company, a corporation of New York Application August 14, 1952, Serial No. 304,358

4 Claims. (Cl. 179—27)

The present invention relates to telephone systems and more particularly to improved telephone systems of the type having local and remote operator attended stations with telephone lines extending therebetween to provide both talking and signalling paths.

In a telephone system of the type having local and remote operator attended office exchanges such as, for example, a local private dial office (PDO) with an attendant's cabinet and a combination trunk circuit for connecting the local automatic system or the attendant's cabinet over a trunk line to a remote manually operated exchange office, it is necessary to provide supervisory control or signalling over the trunk line in a manner that will permit the use of separate power supplies to energize the local and remote exchange offices. System flexibility is thereby achieved which permits local and remote exchange offices to be operated with different power supply potentials as desired while still enabling such exchange offices to be connected together by trunk lines or the like for talking and signalling purposes. Prior to this invention, it has been customary to connect the signalling or supervision relays only of both the local and remote offices in series with the loop of the trunk line and energize such relays from only one of the power supplies at either one of the local or remote offices. In such manner, the individual power supplies for all other relays except the signalling or supervision relays at the remote and local offices are entirely separate and may therefore have different operating potentials.

A serious disadvantage of the above described system for providing supervision signalling over the trunk line loop is readily apparent when the distance between the local and remote offices is very great and the trunk line loop is correspondingly long with a consequent high resistance. Under such conditions, the operation of the signalling relays that are connected at the local and remote offices in series with the trunk line loop is very erratic and uncertain due to the high resistance in the loop reducing the operating potential for the relays to an undesirably low value.

It is therefore a principal object of my invention to provide a telephone system having an improved arrangement for transmitting supervisory signals over very long trunk line connections between local and remote exchange offices.

Another object of my invention is to provide an improved telephone system arranged to reduce the effect of the high resistance of a long loop trunk line on the signalling relays associated therewith in order to assure consistently reliable operation of the signalling relays which may therefore have the same electrical characteristics for use with widely different lengths of trunk line loops.

A feature of the invention as used in a telephone system having local and remote offices with a long loop trunk line connected therebetween and a common ground connection which is usually the earth extending between the offices, is the provision of means for transmitting supervisory signals in one direction between the local and remote offices over one conductor of the trunk line loop in series with a power supply at one of the stations and the common ground together with means for transmitting supervisory signals in the other direction between the local and remote offices over another conductor of the trunk line loop in series with the aforementioned power supply and common ground. In such an arrangement the effective trunk line loop resistance, insofar as the signalling means is concerned, is approximately one half of the total trunk line loop resistance.

Further objects, features and the attending advantages of the invention will be apparent with reference to the following specification and drawings in which.

Figure 1:
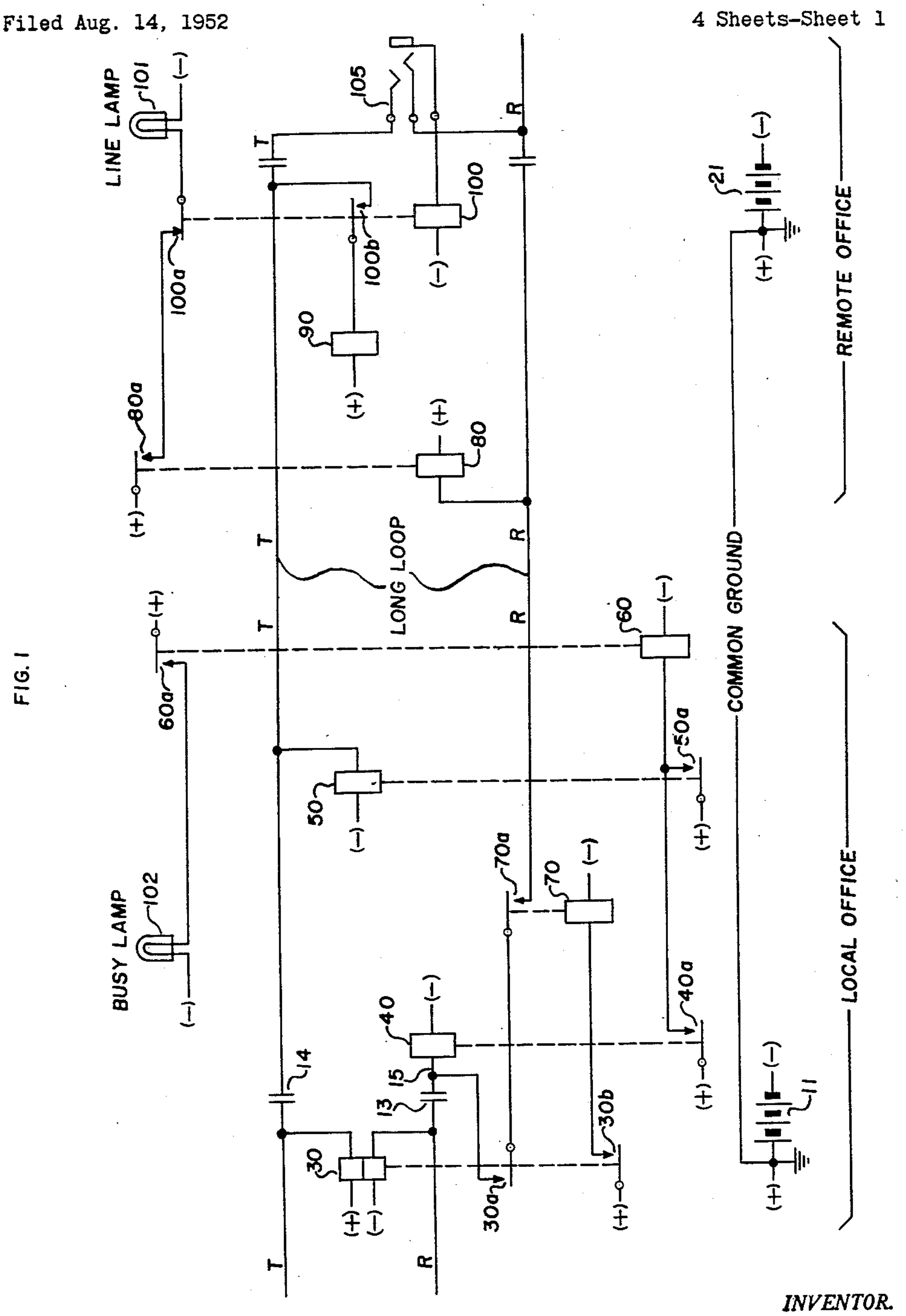
Fig. 1 is a simplified circuit diagram of the supervisory signal means of the invention as applied to a telephone system including local and remote offices with the circuits of the offices simplified to omit elements not essential to an understanding of the invention.

Referring to Fig. 1 of the drawings, the invention will now be described in connection with a simplified circuit arrangement and it will be understood that various relays and relay contacts have been omitted in this instance in order to simplify an understanding of the invention. A local office is shown to the left of the figure and a remote office is shown to the right of the figure with a long loop trunk line, including tip conductor T and ring conductor R, connected therebetween. A common ground to which the positive terminals of power supplies 11 and 21 are connected also extends between the local and remote office and usually this ground may be the earth. The battery power supply 11 having its positive terminal connected to earth is provided for the local office, while the battery 21 is provided and similarly connected for the remote office. The local office includes a calling bridge relay 30, supervisory signalling relays 40 and 50, a signal relay 60 and a release delay relay 70 all of which are connected to be energized by power supply 11. The remote office includes line relays 80 and 90 and a sleeve relay 100. It will be noted that relays 80 and 90 are arranged to be connected to common ground and through either conductors T or R to relays 40 and 50, respectively, and battery 11. Signalling lamps 101 and 102 are also provided for the remote and local office, respectively. In this connection it is desired to point out that a more detailed form of the invention would provide somewhat different connections for the signalling lamps 101 and 102 as will be more completely described in connection with Figs. 2 and 3 of the drawings.

Upon extending a call from the local office to the remote office a circuit is completed through the incoming tip and ring leads T and R and the calling bridge relay 30 to actuate such relay and operate contacts **30*a* and 30*b*. Operated contacts 30*b* energize the release delay relay 70 to operate contacts 70*a*, and the incoming ring conductor R is thereby extended through the condenser 13 and operated contacts 30*a* and 70*a* to ring conductor R of the long loop trunk line. The incoming tip conductor T is connected by a condenser 14 to the long loop trunk line tip conductor T. It will be noted that the supervisory relay 40 is connected by conductor 15 in circuit with minus of battery 11 to the ring conductor R through operated contacts 30*a* and 70*a*. It will also be noted that line relay 80 at the remote office is directly connected between ground and the ring conductor R of the long loop trunk line. Therefore, after the operation of the calling bridge relay 30 and the release delay relay 70, the supervisory relay 40 in the local office and the line relay 80 at the remote office operate together in series with the ring conductor R of the trunk line and are energized by battery 11 in circuit with common ground. The operation of the line relay 80 closes contacts 80*a* to energize the line signalling lamp 101 from battery 21 through normally closed contacts 100*a***.

The operator at the remote office upon noting the energization of signal lamp 101 plugs into the jack 105 and, in a conventional manner, through the operator's cord circuit energizes the sleeve relay 100 from battery 21 to open contacts 100*a* and deenergize the signal lamp 101. At the same time contacts 100*b* are operated to connect the line relay 90 to the tip conductor T of the long loop trunk line. It will be noted that the supervisory relay 50 of the local office is connected directly between battery 11 and the tip conductor T so that the operation of contacts 100*b* causes line relay 90 at the remote office and supervisory relay 50 at the local office to operate together in series over the tip conductor of the long loop trunk line and the battery 11 of the local office. The operation of the supervisory relay 50 closes contacts 50*a* which, in connection with the present description of the simplified form of the invention, have no function at this time since contacts 40*a* have been previously operated to energize the signal relay 60 and close contacts 60*a* for energizing the busy signal lamp 102.

In the preceding paragraphs the operation of supervisory relays 40 and 50 and line relays 80 and 90 upon extending a call from the local office to the remote office has been described. It will be noted that the supervisory relay 40 and line relay 80 operate together over one conductor of the long loop transmission line while the supervisory relay 50 and the line relay 90 operate together over the other conductor of the long line transmission line. Thus, insofar as the electrical characteristics of the supervisory relays 40, 50, 80 and 90 are concerned, the resistance of the long loop trunk line is effectively one half of the total resistance of the loop. It will also be noted that the aforementioned supervisory relays are all operated by the battery 11 of the local station so that the battery 21 of the remote station may have an entirely different operating potential than that of the local station.

Referring again to Fig. 1 of the drawings, the operation of such a circuit, according to the invention, when extending a call from the remote office to the local office will now be described. In order to extend a call the operator plugs her cord circuit into the jack 105 causing sleeve relay 100 to operate from battery 21 and close contacts 100*b*, which connects the line relay 90 over the long loop tip conductor T in series with the supervisory relay 50 of the local office, to local office battery 11 and return over common ground. Relays 90 and 50 therefore operate and contacts 50*a* are closed to energize signal relay 60 and thus energize the busy lamp 102 signalling the attendant at the local office that a call is incoming. The attendant at the local office therefore connects in over incoming tip and ring leads T and R to energize the calling bridge relay 30 and release delay relay 70 thereby connecting the incoming ring conductor R to the ring conductor R of the long loop trunk line. Supervisory relay 40 is also connected and operated with line relay 80 but no signalling is achieved thereby since normally closed contacts 100*a* are now open due to the fact that the call is being extended from the remote office to the local office. It is again desired to point out that the circuit of Fig. 1 is considerably simplified and that the signalling functions obtained by supervisory relays 40, 50 and line relays 80 and 90 may be considerably enlarged as will be described in connection with a preferred embodiment of the invention shown in Figs. 2 and 3 of the drawings.

Figure 4:
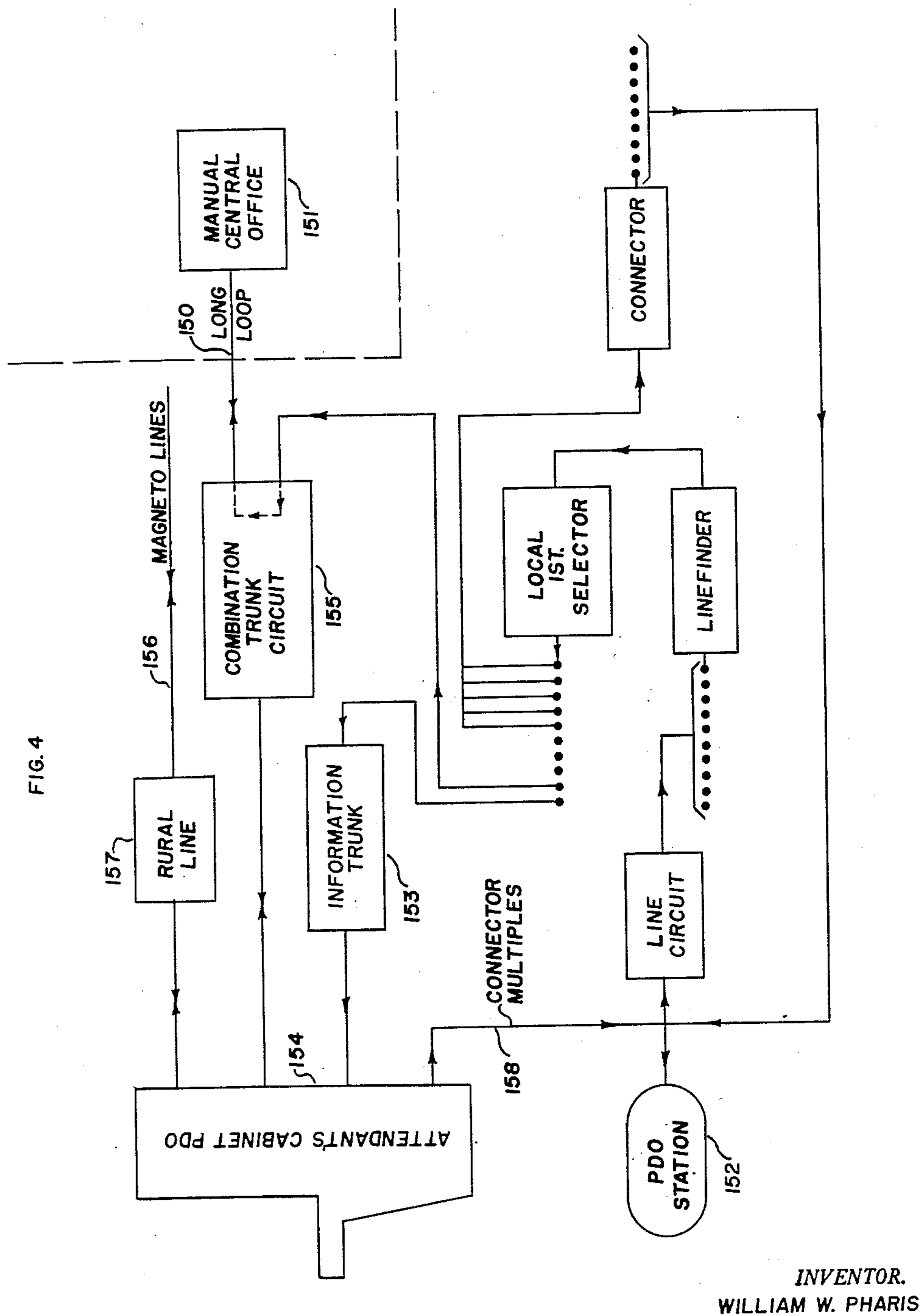
Fig. 4 is a block diagram of one form of telephone system with which the signalling means of the invention may be used.

Fig. 4 of the drawings is a block diagram of a typical telephone system in which the supervisory signal means of the invention may be advantageously employed. A local office is shown to the left of the dashed line to be connected by the long loop 150 with a remote manual central office 151. The local office may be of the type known as a private dial office having an automatic dial system for connecting various private dial office stations such as the one shown at 152 with each other or through an information trunk 153 to an attendant's cabinet 154. The local office system also provides for connecting any of the stations such as 152 through the combination trunk circuit 155 to the long loop trunk line 150 and the manual central office 151. Rural non-automatic stations may be connected by the magneto line 156 and rural line circuit 157 to the attendant's cabinet 154 for connection by the attendant with either the combination trunk circuit 155 and manual central office 151, or with the private dial office stations such as 152, over the connector multipled lines 158. The required line circuit, linefinder circuit and switch, selector circuit and switch, and connector circuit and switch, are also shown in a conventional circuit arrangement with the attendant's cabinet 154 and the combination trunk circuit 155. The arrangement is such that a calling party at the private dial station 152, upon dialing 9, is connected by the local first selector to the combination trunk circuit 155 and over the long loop trunk line 150 to the manual central office 151. Similarly the calling party at the private dial station 152, upon dialing 0, is connected by the information trunk 153 to the attendant's cabinet 154. All incoming calls from the manual central office 151 are connected by the combination trunk circuit through the attendant's cabinet 154 and the connector multiples 158 to the desired private dial office station, such as station 152.

Figure 2:
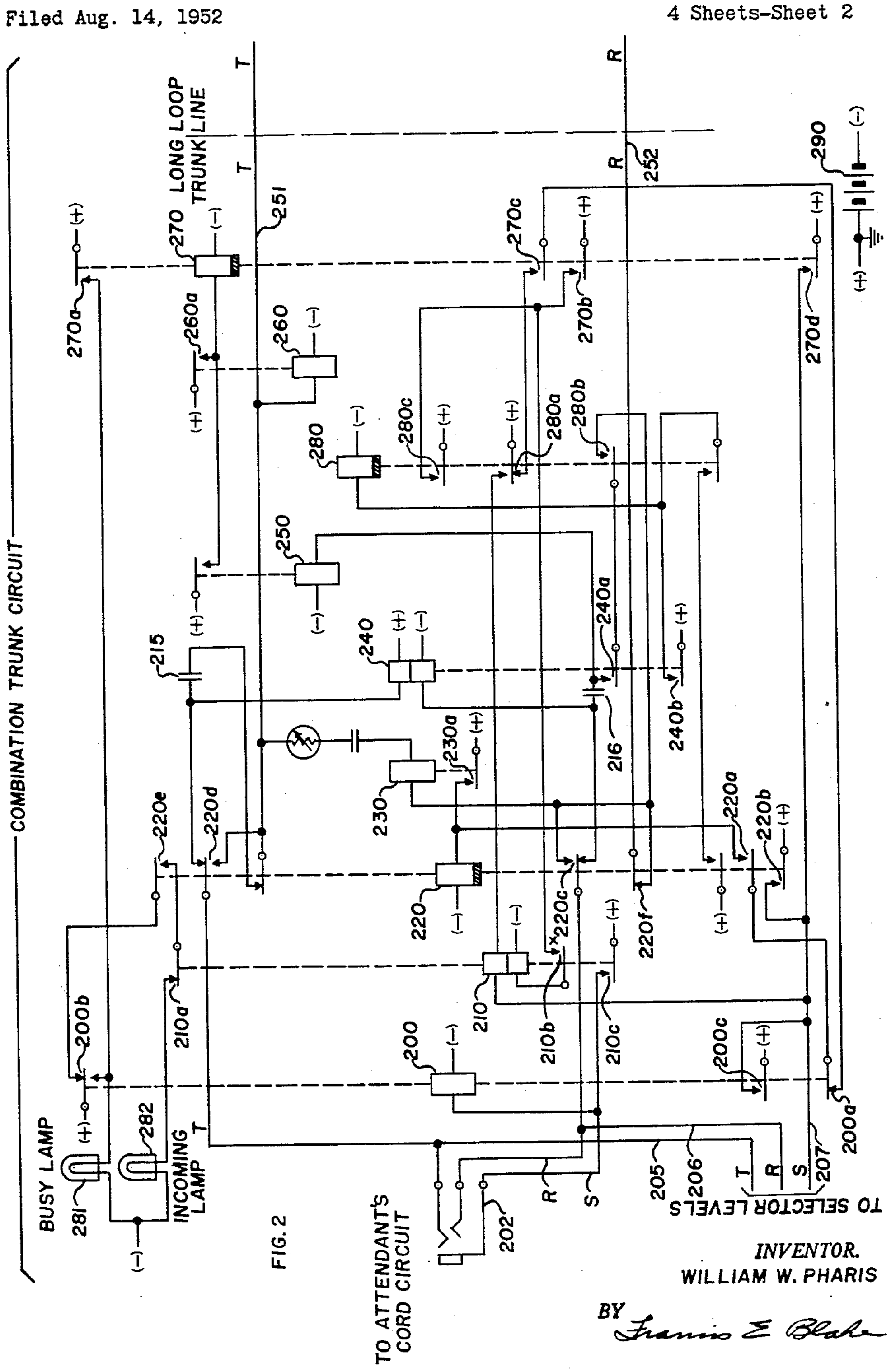
Fig. 2 is a detailed circuit diagram of a combination trunk circuit including supervisory relays connected to a long loop trunk line according to the invention.
Figure 3:
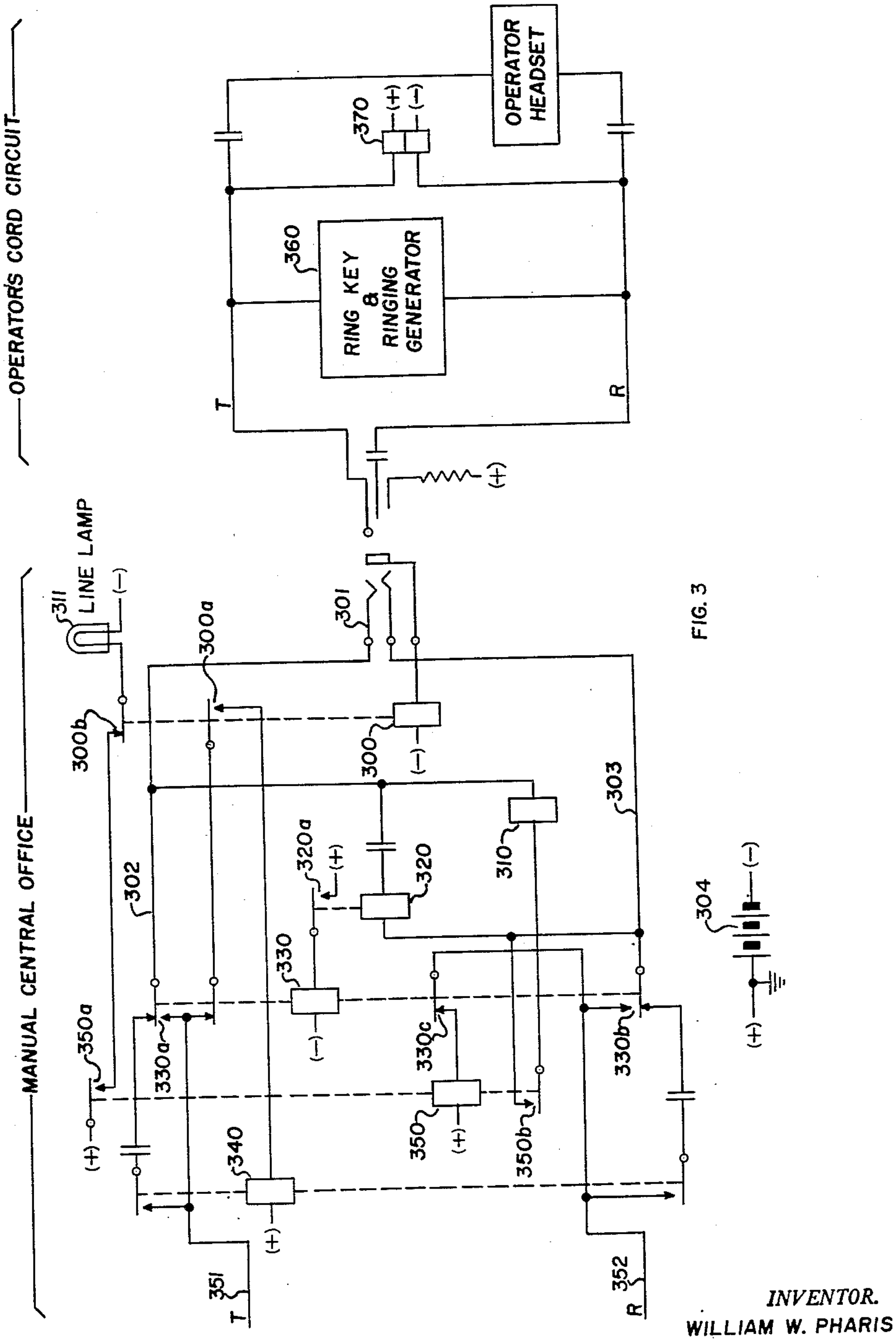
Fig. 3 is a circuit diagram of a manual central office and operator's cord circuit arranged to be connected by a long loop trunk line with the trunk circuit terminals to the right of Fig. 2.

With reference to Figs. 2 and 3 of the drawings, portions of the combination trunk circuit 155 and the manual central office 151 will be described in connection with their operation to provide the supervisory signalling according to the invention. The manual central office circuit portions are shown in Fig. 3 while the combination trunk circuit portions are shown in Fig. 2. A battery 290 is provided for the trunk circuit of Fig. 2 and a battery 304 is provided for the manual central office of Fig. 3 with the positive terminals of both batteries 290 and 304 connected to a common ground. The trunk circuit in Fig. 2 includes sleeve relays 200 and 210, ringing relays 220 and 230, and calling bridge relay 240. The supervisory relays 250 and 260, together with a signalling relay 270 and release delay relay 280, are also provided. A busy signal lamp 281 and an incoming signal lamp 282 are connected to be energized upon the appropriate operation of the relay circuit in the manner to be described.

The manual central office of Fig. 3 includes a sleeve relay 300, a retard coil 310, ringing relays 320 and 330, and line relays 340 and 350. Relays 300 and 330 together with lamp 311 are arranged to be energized from battery 304 of the central office. Tip and ring conductors 351 and 352 are connected by a long loop trunk line with the respective tip and ring conductors 251 and 252 of the trunk circuit of Fig. 2. The manual central office (Fig. 3) also includes an operator's cord circuit having a conventional ring key and ringing generator source, generally shown by block outline at 360, together with a bridge relay 370 forming a portion of the transmission bridge with the manual central office and the trunk circuit as is conventional.

The operation of the signalling circuit of the invention in connection with extending a call from the manual central office through the combination trunk circuit to the attendant's cabinet of the private dial office will now be described. In order to extend the call, the operator plugs the cord circuit into the jack 301 to operate sleeve relay 300, closing contacts 300*a*, and opening contacts 300*b*. The closing of contacts 300*a* connects line relay 340 from common ground to the long loop tip conductors 351 and 251 and the supervisory relay 260 (Fig. 2) to the ungrounded terminal of battery 290 of the combination trunk circuit. Supervisory relay 260 therefore operates to close contacts 260*a* and energize signalling relay 270 to close contacts 270*a* and energize the busy signal lamp 281. The operation of signal relay 270 also closes contacts 270*b*, 270*c* and 270*d*. The operation of contacts 270*d* places guarding ground on the sleeve conductor 207 to identify the trunk circuit as being busy to any of the selectors of the private dial office.

The operator at the manual central office then operates her ring key and generator 360 causing the ringing relay 320 of the manual central office to operate and close contacts 320*a* thereby energizing ringing relay 330. The operation of ringing relay 330 operates contacts 330*a* and 330*b* to extend the incoming tip and ring conductors 302 and 303 on a metallic through basis with the long loop trunk circuit tip and ring conductors 251, 351 and 252, 352. Ringing current from the operator's cord circuit ringing generator 360 is thereby conducted by tip and ring conductors 351, 251 and 352, 252 of the long loop trunk circuit to operate ringing relay 230 which closes contacts 230*a* to energize ringing relay 220. Ringing relay 220 locks up over operated contacts 220*a* in series with the normally closed contacts 200*a* and operated contacts 270*c* through normal contacts 280*a* to ground. The operation of ringing relay 220 places an additional ground through operated contacts 220*b* on the selector sleeve lead 207. The operation of ringing relay 220 also operates contacts 220*c* and 220*d* connecting the attendant's cord circuit jack 202 on a metallic through basis with the tip and ring conductors 251 and 252. The operation of ringing relay 220 also operates contacts 220e to energize the incoming signal lamp 282 through an obvious circuit including normal contacts 200b and 210a. The attendant upon noting the illumination of the incoming lamp 282 plugs into the cord circuit at the jack 202 to energize the sleeve relay 200 and operate contacts 200b to deenergize the incoming signal lamp 282 and maintain the energization of the busy signal lamp 281. The operation of sleeve relay 200 also closes contacts 200c, placing an additional ground on the selector sleeve lead 207, and contacts 200a are operated to break the holding circuit for the ringing relay 220 which thereupon returns contacts 220c and 220d to their normal position and connects the calling bridge relay 240 with the attendant's cord circuit. The calling bridge relay 240 thereby operates to close contacts 240a and 240b. The closure of contacts 240b energizes the release delay relay 280 to operate contacts 280b which together with the previously mentioned operation of contacts 240a and through the normal contacts 220f connects the attendant's tip and ring conductors to tip and ring conductors 251 and 252 through capacitors 215 and 216. The attendant of the private dial office is thereby enabled to converse with the operator at the manual central office and can extend the incoming call through the attendant's cabinet in a conventional manner to any of the private dial office stations as desired.

The only supervision the attendant at the private dial office receives is from the local private dial office station and the attendant unplugs the cord circuit only when the local subscriber hangs up. Upon unplugging the cord circuit from the jack 202, the circuit through the calling bridge relay 240 is opened and the sleeve relay 200 is deenergized. The release of the calling bridge relay 240 opens the circuit through the tip and ring conductors to the central office at contacts 240a and opens the circuit to the release delay relay 280 at contacts 240b. The supervisory relay 250 is also disconnected from the long loop ring lead 252 at contacts 240a to cause the line relay 350 at the manual central office to be likewise deenergized to open the circuit to the line lamp 311 at normal contacts 350a. The release of the line relay 350 at the central office gives disconnect supervision at such office by disconnecting the retard coil 310 at normal contacts 350b whereupon the operator at the central office unplugs to release the sleeve relay 300 and deenergize the line relay 340 thereby releasing the supervisory relay 260 of the trunk circuit. In such manner the circuits return to normal and ground is removed from the selector sleeve conductor 207 and the busy signal lamp 281 deenergized with the circuits in condition for receiving other calls. In this connection it should be pointed out that the release delay relay 280 is of the slow-release type and is therefore the last relay of the trunk circuit to release, thus, assuring the desired sequential operation of the various relays in the releasing operation.

In order to extend a call from the attendant's cabinet to the manual central office over the long loop trunk line, the attendant plugs her cord circuit into the jack 202 causing the sleeve relay 200 to operate, placing ground on the sleeve conductor 207 of the selector leads to make the trunk circuit busy to this access. Contacts 200b are also operated to energize busy signal lamp 281. Plugging in the cord circuit also operates the calling bridge relay 240 which closes a circuit through operated contacts 240b to energize the release delay relay 280. The operation of release delay relay 280 closes a transmission path from the attendant's cord circuit 202 through operated contacts 240a, 280b, and normal contacts 220f to the manual central office of Fig. 3. Therefore, the supervisory relay 250 is operated from the trunk circuit battery 290 through operated contacts 240a, 280b, normal contacts 220f and normal contacts 330c (Fig. 3) in series and together with line relay 350 and common ground. The line relay 350, in operating, closes contacts 350a to energize the manual central office signalling line lamp 311 through normally closed contacts 300b. The operation of line relay 350 also closes contacts 350b to connect the retard coil 310 across the tip and ring conductors 302 and 303 to complete the talking battery circuit for the central office and operator's cord circuit. The operator upon noting the energization of lamp 311 plugs in and thereby operates the sleeve relay 300 to open contacts 300b and deenergize the line lamp 311. At the same time the line relay 340 is connected through operated contacts 300a with the supervisory relay 260 (Fig. 2) of the trunk circuit to battery 290 and common ground. Supervisory relay 260 therefore operates to close contacts 260a and energize signal relay 270 and thereby place multiple ground on the selector sleeve conductor 207. Conversation may now take place over the tip and ring conductors of the long loop transmission line with transmission battery supplied through the windings of the calling bridge relay 240. The talking path is the same as has been previously described in connection with the operation of the trunk circuit upon an incoming call from the manual central office.

The release of the circuit is the same as has been previously described in that the attendant in the private dial office unplugs when the calling party at the private dial station hangs up and supervision to the manual central office is provided by the release of the line relay 350 in response to the disconnection of the supervisory relay 250 in series therewith which results by the final release of the release delay relay 280. In this connection it should be pointed out that the release of the line relay 350 returns contacts 350b to normal to disconnect the retard coil 310 from the tip and ring conductors 302 and 303 thus providing supervision to the central office operator over conventional circuit arrangements, not shown.

As has been previously described in connection with Fig. 4 of the drawings, when a calling party at private dial office station 152, for example, desires to call the manual central office 151, 9 is dialed to connect the station 152 through the local first selector with the combination trunk circuit 155. Such connection may be made over the tip and ring conductors 205 and 206 and sleeve conductor 207 of the combination trunk circuit of Fig. 2. The calling bridge relay 240 is therefore operated as previously described to operate the release delay relay 280 and connect the supervisory relay 250 in series over the ring conductors 252, 352 of the long loop trunk line to the manual central office and the line relay 350 to common ground. Line relay 350 in operating closes contacts 350a to energize the line signal lamp 311 and signal the operator at the central office that an incoming call is to be received. The operation of the release delay relay 280 also connects ground through contacts 280a to energize the sleeve relay 210 which is conventionally connected to the sleeve conductor 207 of the selector and battery through other relay circuit portions of the selector circuit, not shown. The operation of the sleeve relay 210 identifies the trunk circuit as being seized by a selector and opens contacts 210a to prevent the incoming lamp 282 from being energized. It should also be pointed out that the sleeve relay 210 is locked into operation through the preliminary make contacts 210b from ground provided by the operated contacts 280c of the release delay relay 280. The operation of the sleeve relay 210 also closes contacts 210c to connect ground to the sleeve lead of the attendant's cord circuit and energize the sleeve relay 200 thus closing contacts 200b and lighting the busy signal lamp 281.

The circuit functions as previously described when the operator at the manual central office upon noting the energization of line signal lamp 311, answers by plugging her cord circuit into the jack 301. Similarly the release of circuits are the same as previously described, the release being controlled by the calling party at the private dial office station who must hang up in order to release the circuits.

Under certain conditions of operation it may be desirable to recall the attendant at the attendant's cabinet at the private dial office on a call from the manual central office. In order to do so the operator at the manual central office applies ringing current from her ring key 360 to energize ringing relays 320 and 330 and connect ringing current on a metallic through basis over the long loop tip and ring conductors 351, 251, and 352, 252, to operate the ringing relay 230 of the trunk circuit. The operation of the ringing relay 230 closes a circuit to energize ringing relay 220 which closes tip and ring conductors 251 and 252 through to the attendant's cord circuit jack 202 on a metallic through basis. The operation of ringing relay 230 also closes a circuit through the normal contacts 200b of sleeve relay 200, operated contact 220e, and normal contacts 210a to light the incoming signal lamp 282 thus providing a recall signal for the attendant operator.

In the foregoing paragraphs I have described a novel supervisory signalling means particularly adapted to be used in connection with long loop trunk lines extending between local attended offices and remote attended offices. I have also described the application of the invention to one preferred form of telephone system including a combination trunk circuit and a local private dial office and a remote manual central office. It should be understood, however, that the arrangement for operating signalling and supervisory relays over the long loop trunk line in a manner to reduce the effect of the trunk line loop resistance as provided by this invention may be used with any long loop trunk line system wherein operator supervision at each end of the system is desired. Furthermore, the manner of connecting the supervisory and signalling relays over one conductor of a trunk line in series with a battery at one end of the trunk line and common ground may be used in systems wherein supervision may be required in only one direction along the trunk line. Various other modifications may be made within the spirit of the invention and the scope of the appended claims.

What I claim is:

1. A telephone system including in combination, a local office, a remote office, at least one line providing a talking and signalling path and connected between said local office and said remote office, said line having a plurality of conductors, first means connected to a first one of said conductors and adapted to be controllably energized to provide signalling from said local office to said remote office, second means connected to a second one of said conductors and adapted to be controllably energized to provide signalling from said remote office to said local office, and a power supply at one of said offices for energizing both said first and second means.

2. A telephone system including in combination a local office, a remote office, at least one long loop line providing a talking and signalling path and connected between said local office and said remote office, said line having at least two conductors, first signalling means including a relay at said local office and a relay at said remote office connected in series over a first one of said conductors and adapted to be controllably energized and operated to provide signalling from said local office to said remote office, second signalling means including a relay at said remote office and a relay at said local office connected in series over a second one of said conductors and adapted to be controllably energized and operated to provide signalling from said remote office to said local office, and a power supply at said local office for energizing the relays of both said first and second means.

3. A telephone system including in combination a local office, a remote office, a first power supply for energizing said local office, a second power supply for energizing said remote office, at least one long loop line providing a talking and signalling path and connected between said local office and said remote office, said line having at least two conductors, first signalling means including a relay at said local office and a relay at said remote office connected in series over a first one of said conductors and adapted to be controllably energized and operated to provide signalling from said local office to said remote office, second signalling means including a relay at said remote office and a relay at said local office connected in series over a second one of said conductors and adapted to be controllably energized and operated to provide signalling from said remote office to said local office, said first power supply at said local office being connected to energize the relays of both said first and second means.

4. A telephone system including in combination a local office, a remote office, a direct current power supply having positive and negative terminals for energizing said local office, a common ground connected to one terminal of said power supply, and extending between said local and remote offices, at least one long loop line providing a talking and signalling path and connected between said local office and said remote office, said line having at least two conductors, first signalling means including a relay at said local office and a relay at said remote office adapted to be controllably operated to provide signalling from said remote office to said local office, second signalling means including a relay at said remote office and a relay at said local office adapted to be controllably operated to provide signalling from said local office to said remote office, means connecting the relay at said local office for said first signalling means between the ungrounded terminal of said power supply and a first one of said conductors, means controllably connecting the relay at said remote office for said first signalling means between said common ground and the first one of said conductors, means controllably connecting the relay at said local office for said second signalling means between the ungrounded terminal of said power supply and a second one of said conductors, and means connecting the relay of said remote office for said second signalling means between said common ground and the second one of said conductors, whereby the relays of said first and second signalling means may be controllably operated in series and energized by said first power supply to provide signalling between said local and remote offices over said long loop line.

References Cited in the file of this patent

UNITED STATES PATENTS 1,325,184 Young ---------------- Dec. 16, 1919

OTHER REFERENCES

"Telephony," (Atkinson), vol. I, page 252, 1948.